2 Sheets—Sheet 1.

E. G. HORNE.
Cotton-Gin Hopper.

No. 218,270. Patented Aug. 5, 1879.

WITNESSES
F. L. Ourand
J. Walter Fowler

INVENTOR
E. G. Horne,
By, H. J. Ennis
ATTORNEY

N. PETERS, PHOTO-LITHOGRAPHER, WASHINGTON, D. C.

E. G. HORNE.
Cotton-Gin Hopper.

No. 218,270.  Patented Aug. 5, 1879.

UNITED STATES PATENT OFFICE.

EDWARD G. HORNE, OF CALLOWAY, TEXAS.

IMPROVEMENT IN COTTON-GIN HOPPERS.

Specification forming part of Letters Patent No. 218,270, dated August 5, 1879; application filed May 20, 1879.

*To all whom it may concern:*

Be it known that I, EDWARD G. HORNE, of Calloway, in the county of Upshur and State of Texas, have invented certain new and useful Improvements in Cotton-Gin Hoppers; and I do hereby declare that the following is a full, clear, and exact description of the invention, which will enable others skilled in the art to which it appertains to make and use the same, reference being had to the accompanying drawings, and to letters of reference marked thereon, which form a part of this specification.

My invention relates to an improved cotton-gin; and the novelty consists in the construction and arrangement of parts, as will be more fully hereinafter set forth, and specifically pointed out in the claims.

The object of the invention is to provide an efficient and practical cotton-gin which will have a maximum amount of operating service with a minimum amount of motive power; and to this end I reduce the amount of friction-surface.

In carrying out my invention, I provide a main or power shaft with pulley-connection, which shaft carries the gin-saws, and also a friction-pulley, as shown. This friction-surface is held in forcible contact with a central roll mounted upon a shaft journaled in a pivoted or hinged hopper-box, and it is also in frictional contact with two groups of endless belts, which revolve upon rolls in the fixed ends of the hinged hopper-box, as shown, the rolls being arranged to correspond with the area of the circumference of the friction-roll. The mouth of the hopper is between the two belts, and guides or gin-ribs are provided, between which the gin-saws revolve. Stationary disks upon the hopper-heads serve to hold the belts in their curved or circular position. A fly-wheel upon the main shaft has friction-connection with a fixed pulley upon a shaft carrying the fan-wheel, and this shaft has frictional connection with two friction-wheels upon each end, as shown.

Figure 1:
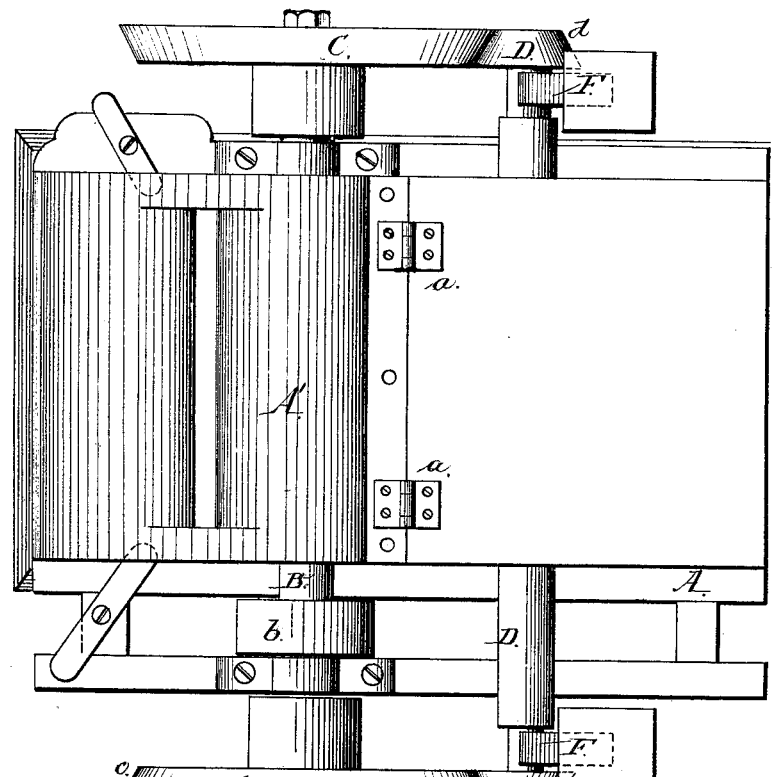
Figure 2:
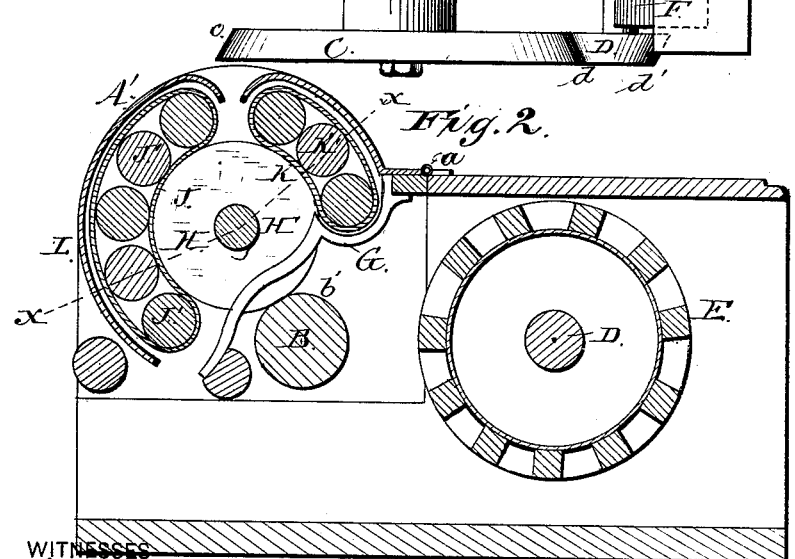
Figure 3:
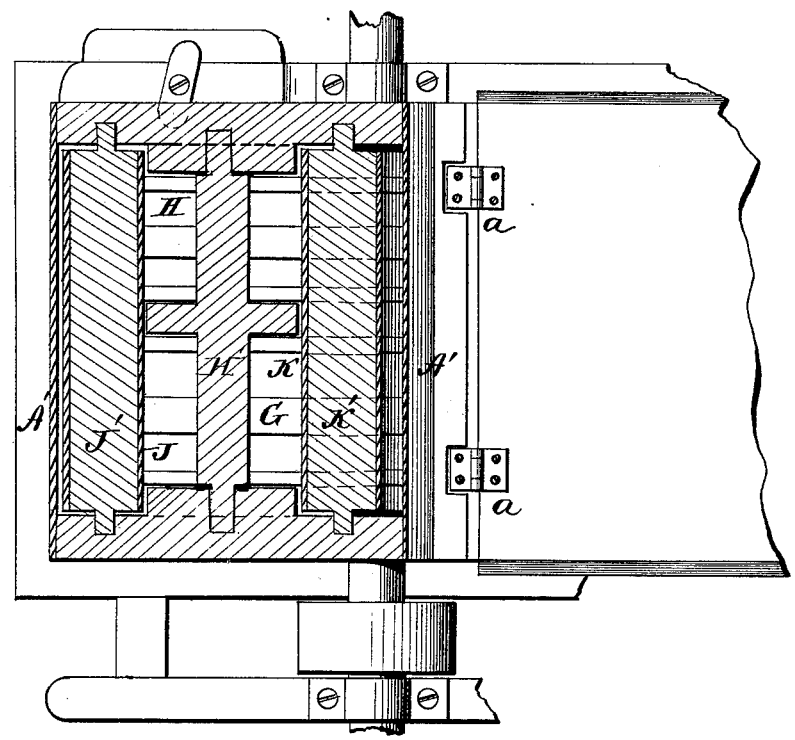

Figure 1 represents a top view of my improved apparatus; Fig. 2, a vertical sectional view of the same, and Fig. 3 a sectional view on the line $x\,x$ of Fig. 2.

Referring to the drawings, A represents the body of the machine, and A' the hopper-box, hinged at $a$, as shown. B represents the power-shaft, having pulley $b$, friction-surface $b'$, and carrying fly-wheels C. These fly-wheels have inclined friction-surfaces $c$, which are held in forcible contact with inclined surfaces $d$ upon friction-rolls $d'$, rigid with a shaft, D, carrying the fan or cotton-wheel E, as shown. The shaft D has friction-bearing on pulleys F upon each side of the machine, and the inclined surfaces $c\,d$, being in reverse directions upon each side, tend to hold the whole running-gear in firm connection.

The shaft B carries the gin-saws, which work between gin-ribs or finger-guides G in the hopper-box A', as shown. The friction-surface $b'$ bears with close contact against the friction-roll H upon a shaft, H', journaled in circular disks I upon the hopper-heads. This roll H is in contact with an endless belt, J, passing over rollers J', arranged in circular form to correspond with the circle described by the circumference of the roll H, and with belt K, running over rollers K', similarly arranged. The hopper-mouth is situated between the two belts and the cotton-seed exit below.

The belts bear against the periphery of the disks I upon each end, which prevents their sagging. A shield, L, arranged to inclose the outside of the belts, and bent over their upper end rollers, prevents the belts from carrying back cotton.

The operation of the device, from the foregoing description, is obvious.

What I claim as new, and desire to secure by Letters Patent, is—

1. The revolving hopper composed of the belts J K, the rollers J' K', and friction-roll H, operated from shaft B $b$, as and for the purposes specified.

2. The belts J K and rolls J' K', combined with the disks I, as set forth.

3. The shield L, arranged to inclose the belts and curved over their ends at the feed-opening to prevent the return of cotton, as set forth.

In testimony that I claim the foregoing as my own I affix my signature in presence of two witnesses.

EDWARD GIDEON HORNE.

Witnesses:
 E. W. CALHOUN,
 T. W. WOLFE.